United States Patent
Belcaid et al.

(10) Patent No.: US 7,231,408 B2
(45) Date of Patent: Jun. 12, 2007

(54) DATA RECOVERY IN A DISTRIBUTED SYSTEM

(75) Inventors: Adel Belcaid, Tampere (FI); Kari Lahdensuo, Nokia (FI)

(73) Assignee: Nokia Corporation, Espoo (FI)

( * ) Notice: Subject to any disclaimer, the term of this patent is extended or adjusted under 35 U.S.C. 154(b) by 115 days.

(21) Appl. No.: 10/201,627

(22) Filed: Jul. 24, 2002

(65) Prior Publication Data

US 2003/0065685 A1   Apr. 3, 2003

Related U.S. Application Data

(63) Continuation of application No. PCT/FI01/00064, filed on Jan. 25, 2001.

(30) Foreign Application Priority Data

Jan. 28, 2000   (FI) .................................. 20000178

(51) Int. Cl.
*G06F 12/00* (2006.01)
*G06F 7/00* (2006.01)
(52) U.S. Cl. .................. 707/202; 707/10; 707/200
(58) Field of Classification Search ............ 707/1–202, 707/203
See application file for complete search history.

(56) References Cited

U.S. PATENT DOCUMENTS

| | | | | |
|---|---|---|---|---|
| 4,864,497 A | * | 9/1989 | Lowry et al. ............... | 707/102 |
| 5,140,689 A | * | 8/1992 | Kobayashi ................... | 714/20 |
| 5,307,354 A | * | 4/1994 | Cramer et al. ................ | 714/4 |
| 5,333,314 A | * | 7/1994 | Masai et al. ................. | 707/202 |
| 5,396,613 A | * | 3/1995 | Hollaar .......................... | 714/4 |
| 5,511,188 A | * | 4/1996 | Pascucci et al. ............ | 707/203 |
| 5,546,574 A | | 8/1996 | Grosskopf et al. .......... | 707/201 |
| 5,621,721 A | | 4/1997 | Vatuone ...................... | 370/394 |
| 5,689,579 A | * | 11/1997 | Josephson ................... | 382/137 |
| 5,701,423 A | * | 12/1997 | Crozier ....................... | 715/762 |
| 5,765,171 A | | 6/1998 | Gehani et al. .............. | 707/203 |

(Continued)

FOREIGN PATENT DOCUMENTS

EP   833 539   4/1998

(Continued)

OTHER PUBLICATIONS

Walter H. Kohler, "A Survey of Techniques for Synchronization and Recovery in Decentralized Computer Systems", Computing Surveys, vol. 13, No. 2, Jun. 1981, pp. 149-183.*

(Continued)

*Primary Examiner*—Don Wong
*Assistant Examiner*—Linh Black
(74) *Attorney, Agent, or Firm*—Pillsbury Winthrop Shaw Pittman LLP

(57) ABSTRACT

In a distributed system, where data is maintained in at least two databases and the data includes at least one data element, the amount of data transmitted during data recovery is minimized by comparing a first total of the data elements of the data in a first database with a second total of a corresponding data elements of corresponding data in a second database. An updating procedure for the data element is initiated if the first total and the second total are not the same.

20 Claims, 2 Drawing Sheets

U.S. PATENT DOCUMENTS

| | | | |
|---|---|---|---|
| 5,870,759 A * | 2/1999 | Bauer et al. | 707/201 |
| 5,937,343 A * | 8/1999 | Leung | 455/403 |
| 5,941,955 A * | 8/1999 | Wilby et al. | 709/242 |
| 5,974,574 A * | 10/1999 | Lennie et al. | 714/52 |
| 5,978,803 A * | 11/1999 | Ooe | 707/10 |
| 6,052,695 A * | 4/2000 | Abe et al. | 707/202 |
| 6,098,078 A * | 8/2000 | Gehani et al. | 707/203 |
| 6,122,754 A * | 9/2000 | Litwin et al. | 714/4 |
| 6,202,067 B1 * | 3/2001 | Blood et al. | 707/10 |
| 6,335,937 B1 * | 1/2002 | Chao et al. | 370/426 |
| 6,446,092 B1 * | 9/2002 | Sutter | 707/203 |
| 6,499,129 B1 * | 12/2002 | Srinivasan et al. | 716/4 |
| 6,516,327 B1 * | 2/2003 | Zondervan et al. | 707/200 |
| 6,553,388 B1 * | 4/2003 | Perks | 707/201 |
| 6,553,389 B1 * | 4/2003 | Golding et al. | 707/202 |
| 6,684,169 B2 * | 1/2004 | Masella et al. | 702/66 |
| 2001/0014893 A1 * | 8/2001 | Boothby | 707/201 |

FOREIGN PATENT DOCUMENTS

| | | |
|---|---|---|
| FI | 105870 | 10/2000 |
| FI | 105871 | 10/2000 |
| WO | WO 96/29838 | 9/1996 |
| WO | WO 97/41703 | 11/1997 |
| WO | WO 99/17200 | 4/1999 |

OTHER PUBLICATIONS

Timothy Mann, Andy Hisgen, Garret Swart, "An Algorithm for Data Replication", Jun. 1, 1989, pp. 1-55.*

* cited by examiner

DATA RECOVERY IN A DISTRIBUTED SYSTEM

DATA RECOVERY IN A DISTRIBUTED SYSTEM

This application is a Continuation of International Application PCT/FI01/00064 filed 25 Jan. 2001 which designated the U.S. and was published under PCT Article 21(2) in English.

BACKGROUND OF THE INVENTION

The invention relates to the recovery of data in a distributed system and particularly to the recovery of data between a master database and in its slave database(s).

The present invention relates particularly to the recovery of data in exchanges of mobile communication systems, although the invention can also be utilized in any system comprising a distributed multiple database system, i.e. a system where data is stored and maintained in at least two different databases. In the following, the invention is described by way of example with reference to mobile communication systems in particular.

In mobile communication systems where several exchanges offer services to the same subscribers, there is the need to maintain for example subscriber location information in multiple exchanges and to transmit this information from one exchange to another. Such a need to transmit subscriber information exists for example in situations where a subscriber moves from one location area to another. Thus, it must be possible to transmit said location area change to all the exchanges maintaining data concerning the location of the subscriber. If data transmission to all the exchanges requiring the information fails, there is a risk of mutually inconsistent data concerning an individual subscriber in databases in different exchanges.

Another situation where there is a risk of mutually inconsistent data is when one of the databases has to be driven down. Since the down-driven database cannot continuously update the changes that have taken place in the data, the data may change in the meantime in the other databases, but remains unchanged in said down-driven database. As a consequence, the data contained in the databases becomes inconsistent, on the one hand in the down-driven database and on the other hand in other normally functioning databases.

The database contents of various databases are maintained consistent by so called periodic recovery. In previously known solutions, in the recovery, all data is transmitted and copied, i.e. dumped, from one database to the other database (s). A problem with this is that all of the data is dumped regardless of whether the data, or part of the data, is the same in the databases. Thus the recovery causes an unnecessarily high load to the network and at least part of the data is transmitted in vain. Brief description of the invention An object of the invention is to provide a method and an apparatus implementing the method to eliminate the above problem. The object is achieved with a method, a system and network nodes which are characterized in what is disclosed in the independent claims. The preferred embodiments of the invention are set forth in the dependent claims.

The invention is based on finding those data elements in the data which need to be updated by comparing the total of a data element in one database with the total of a corresponding data element in the other database(s). If the totals are the same, there is no need to update the data element. A 'total' refers here to all information compact enough from which it can be unequivocally deduced whether the data in a database is the same as the data in another database. The 'total' can, for example, be a sum which is obtained by calculating the data according to a predefined calculation method. Examples of different kind of totals are a checksum, a check total, a proof total and a hash total. An age indicator, e.g. a time stamp, may also be a total in systems where a difference between age indicators implies that data is different.

The most important advantage of the invention is that only the data elements which differ are updated. Thus no data is transmitted in vain and the network load is minimized.

In a preferred embodiment of the invention, after the need for an update is recognized, in the database in which the totals are compared, a deduction is made as to whether the data element should be updated in the database or in the other database. On the basis of this deduction the database either starts to update the data element to the other database or indicates the other database in which this data element should be updated. A further advantage of this embodiment is that it enables updating from both databases during one data recovery session.

In another preferred embodiment of the invention, a total calculated from the data in one database is compared with a total calculated from the corresponding data in the other database, and only if the totals differ are the data elements which need to be updated searched by a detailed comparison of the data elements. A further advantage of this embodiment is that the databases are not unnecessarily loaded by the detailed comparison of the data elements.

BRIEF DESCRIPTION OF THE FIGURES

The invention will be described in greater detail by means of preferred embodiments with reference to the accompanying figures, in which.

DETAILED DESCRIPTION OF THE INVENTION

Figure 1:
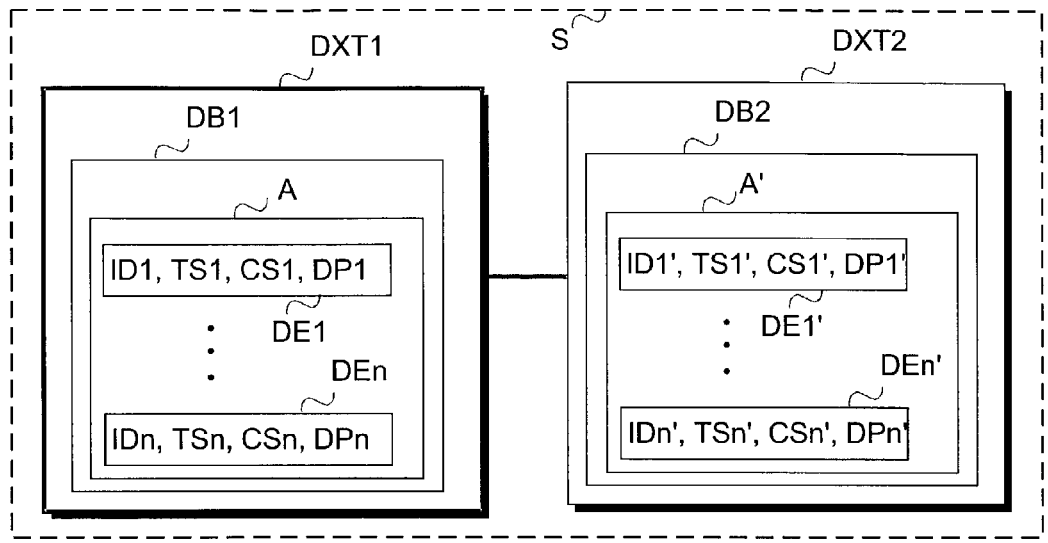
FIG. 1 shows a simplified block diagram of the system in a first preferred embodiment of the invention.

FIG. 1 is a very simplified block diagram of a preferred embodiment of the system S of the invention. FIG. 1 shows only the minimum number of network nodes which are relevant to the understanding of the invention. The part of the system presented in FIG. 1 is assumed to be a part of a TETRA (Terrestrial Trunked Radio) network, where databases maintaining data necessary for the operation of the system are integrated into exchanges yet without limiting the invention to that kind of a particular system. As stated earlier, the invention can be applied to all kinds of systems using distributed multiple databases. Examples of such systems are cellular mobile communications systems, such as the GSM (Global System for Mobile communications), or corresponding mobile systems, such as the PCS (Personal Communication System) or the DCS 1800 (Digital Cellular System for 1800 MHz), and third generation mobile systems, such as the UMTS (Universal Mobile Communication System) and the IMT-2000 (International Mobile Telecommunication System 2000). The invention can be applied both to digital and to analog systems, an example of the latter being the NMT (Nordic Mobile Telephone) system. The invention can also be applied to fixed systems, e.g. to the PSTN (Public Switched Telephone Network), local area networks, wide area networks etc.

Although databases DB1, DB2 in FIG. 1 are integrated into exchanges DXT1, DXT2, a database according to the invention can be integrated into any other network node or the database itself can be a separate network node. An example of the latter is the Home Location Register of the GSM system. The databases may also be in different networks.

The databases DB1 and DB2 in the exchanges DXT1 and DXT2 maintain data necessary for the operation of the system, such as subscriber information and/or group information. The individual subscriber information can include a subscriber identity, subscriber location information, i.e. information indicating the cell in which the subscriber is registered, and subscriber service information, such as information indicating the types of calls the subscriber is entitled to. The subscriber's basic information, e.g. the subscriber identity and the subscriber service information, is always stored in the database of the subscriber's home mobile telephone exchange in the TETRA network. Consequently, the database is called the master database, i.e. it is the master of the specific subscriber information. If the subscriber is registered in some other exchange than the home mobile telephone exchange, the information is also copied in the database of the other exchange and the database is called a slave database. The master database of the subscriber location information is usually the exchange under which the subscriber is, and thus the home mobile telephone exchange may be a slave database for the subscriber location information. Thus, subscriber information may comprise various parts which may have different master databases. The group information is always stored in the TETRA network in the database in the home mobile telephone exchange of the group, i.e. in the master database, and in addition, the information is copied to all databases, i.e. slave databases, of exchanges containing even a single cell in their area where the network supports the operation of the group. Thus each database can simultaneously be a master of some specific data and a slave of some other data.

In the following it is assumed that the database DB1 is the master of data A. The slave database DB2 includes corresponding data A'. Both databases may also include other data not shown in the figure and either be a master or a slave of the other data.

Data A (or file A or record A or data item A) comprises data elements from DE1 to DEn and the corresponding data A' comprises corresponding data elements DE1' to DEn'. Each data element has an information part and a data part DP1, DPn, DP1', DPn'. In the first preferred embodiment, the information part comprises a data identifier ID1, IDn, ID1', IDn', a time stamp TS1, TSn, TS1', TSn' and a checksum CS1, CSn, CS1', CSn'. For example for location data the data identifiers may be subscriber 1, subscriber 2, etc. The time stamp denotes the last updating of the data part and the checksum is calculated from the data part. In some other embodiments some other variable, e.g. an age label, denoting the last updating of the data part can be used instead of the time stamp and/or instead of the checksum some other total can be used. In some other embodiments the data identifier and/or the time stamp may also be counted in the total. In one embodiment of the invention the information part comprises only the data identifier and the total.

A system implementing the functionality of the present invention comprises not only means required for recovering and updating the data according to prior art, but also means for comparing the total of a data element in one database with the total of a corresponding data element in another database. In addition, the system may comprise means for calculating the total of the data to be recovered, means for dividing the data into smaller data groups and/or means for deducing from which database the data element is updated (and to which database the data element is updated). No hardware changes are required in the structure of the system. It comprises processors and memory that can be utilized in the functions of the invention. All changes required for implementing the invention can be made as additional or updated software routines and/or by adding application-specific integrated circuit(s) (ASIC) in the network nodes taking part in the recovery.

Figure 3:
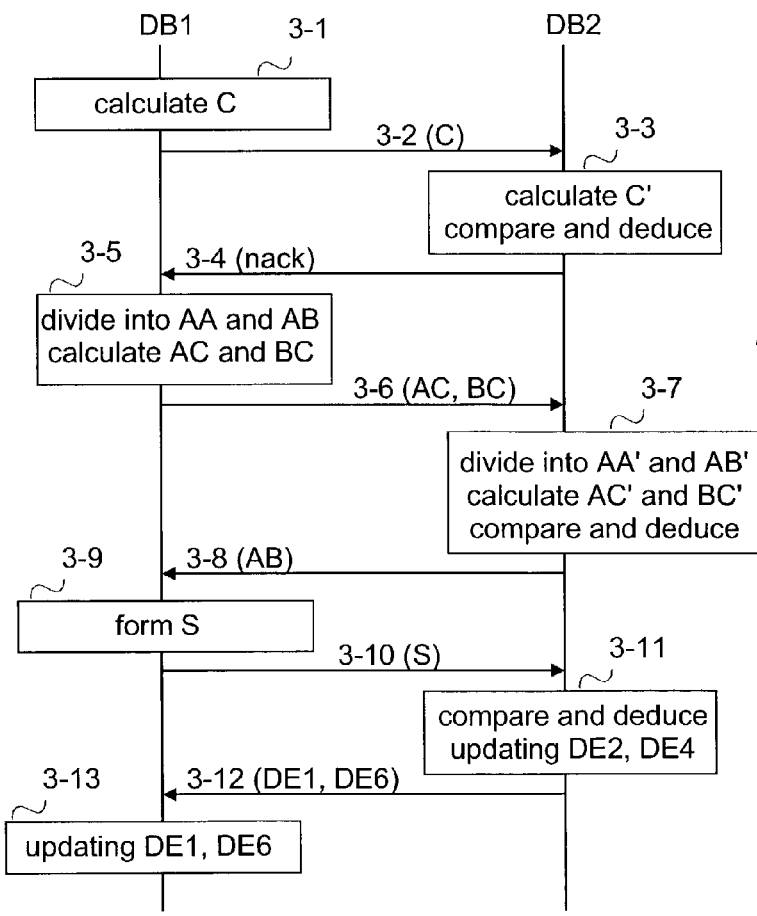
FIG. 3 illustrates signalling according to a second preferred embodiment of the invention.
Figure 2:
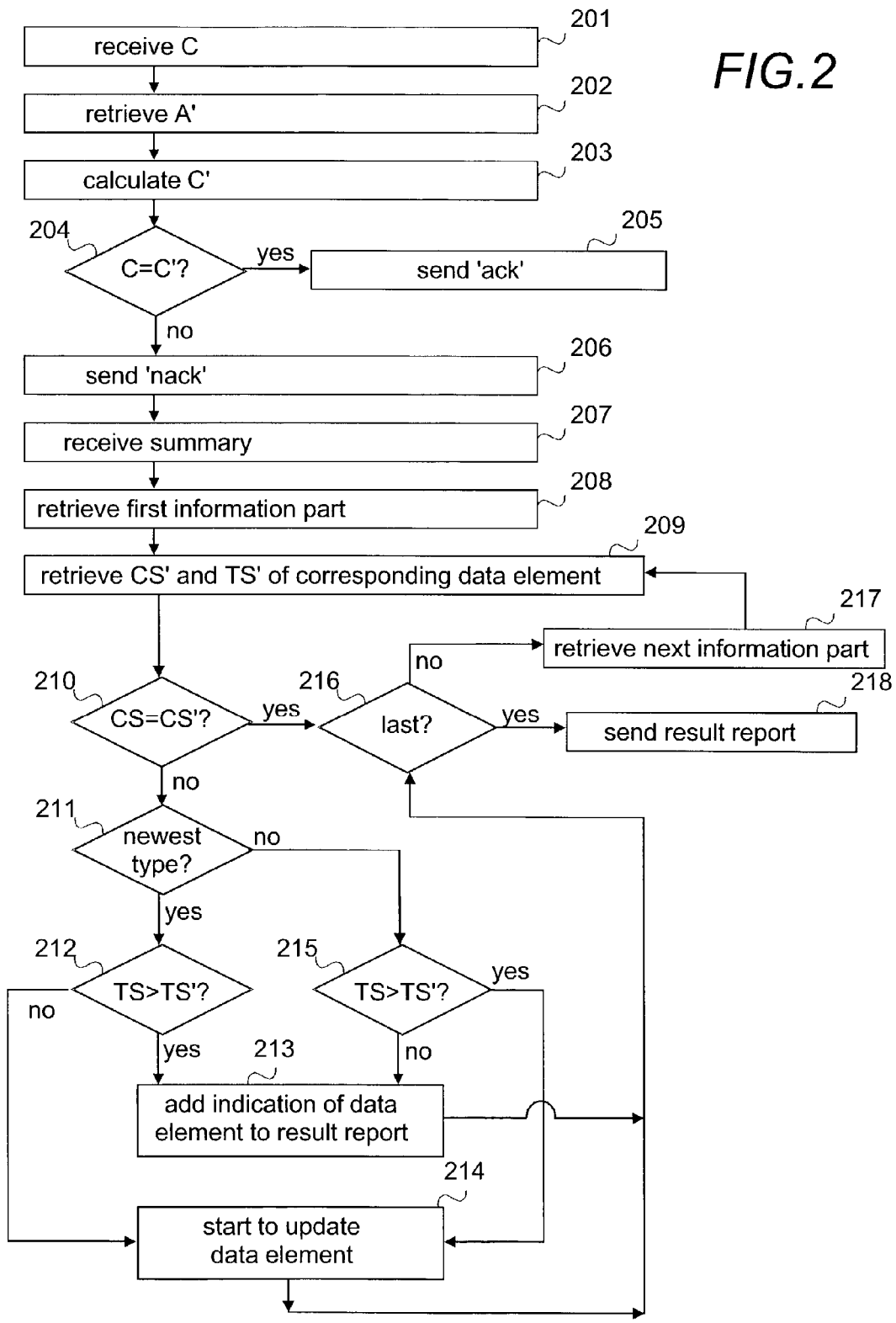
FIG. 2 is a flow chart illustrating functions of a slave database in the first preferred embodiment of the invention.

A network node, comprising the database and means for maintaining (e.g. storing, recovering and updating) data in the database and means for retrieving the data from the database according to prior art, is modified to implement the functions of the invention that are described in more detail in FIGS. 2 and 3. Below, a network node comprising a database is simply called the database. The hardware configuration and basic operation of the network node do not have to be changed. Changes can be carried out as updated or added software routines and/or application-specific integrated circuit(s) (ASIC). Although the network node is preferably modified to implement the functions of both a master database and a slave database, the invention allows the implementation of either the functions of the master database or the functions or part of the functions of the slave database in the network node.

FIG. 2 illustrates the functions of the slave database in the first preferred embodiment of the invention after the recovery has been initiated. Data recovery can be initiated in the master database periodically or on request, for example when an error in the network is detected. Recovery can also be used when a new database added to the network is brought to be in a consistent state with other databases in the network. Recovery may also be used during software upgrades to correct the inconsistencies that may have arisen during the upgrade phase.

When the recovery of data A is initiated, the master database DB1 calculates a checksum C of all data A, including the information parts, i.e. data identifiers, the time stamps and the checksums. In some other embodiments the checksum C is calculated either from the data parts in data A or from the information parts in data A. When the checksum is calculated, the master database sends it to the slave database(s). The slave database(s) is (are) defined in the master database for each different data item of which the master database is a master.

Referring to FIG. 2, the slave database receives, in step 201, the checksum C of data A from the master database. The slave database then retrieves, in step 202, the corresponding data A' from its memory and calculates, in step 203, (using the same rules as the master database) a checksum C' for the corresponding data A'. Then the slave database compares, in step 204, these two checksums C and C'. If they are the same, the slave database sends, in step 205, an acknowledgement 'ack' to the master database indicating that no updating is necessary: data A is consistent with data A'.

If the checksums C and C' are not the same, the slave database sends, in step 206, a negative acknowledgement 'nack' to the master database indicating that data A needs updating. In response to the 'nack', the master database forms a summary comprising for each data element in the data A the information part in the first preferred embodiment, i.e. the summary comprises the data identifiers, the time stamps and the checksums of the data elements. The summary of data A in the first preferred embodiment is thus ID1, TS1, CS1; . . . IDn, TSn, CSn. In some other embodiments of the invention, where it is known for sure that the master database contains the correct data, the time stamps can be left out. The data identifier identifies the data element with which the checksum, i.e. the total, (and the time stamp) is (are) associated. In some embodiments, where the data elements are e.g. exactly in the same order in all databases, it is, however, possible to form the summary without data identifiers. When the master database has formed the summary, the master database sends the summary to the slave database.

The slave database receives, in step 207, the summary and retrieves, in step 208, the first information part in the summary, i.e. ID1, TS1 and CS1. Then the slave database retrieves, in step 209, the time stamp and the checksum of the corresponding data element from its memory. In other words, in step 209 the slave, database retrieves TS1' and CS1' which correspond to TS1 and CS1. Then the slave database compares, in step 210, the checksum CS in the summary with the corresponding checksum CS' in the slave database to find out if they are equal.

If the checksums CS and CS' are not equal, the slave database checks, in step 211, what kind of data is in question, i.e. the slave database checks if the data is to be updated according to the newest time stamp or oldest time stamp. The time stamp indicates the last modification, i.e. the bigger (higher) it is, the newer (younger) is the data. If an age label is used instead of the time stamp, it is to be remembered that the age label gives the age of the data, i.e. the smaller the age label, the newer (younger) the data. For example, a subscriber's location data is updated according to the newest time stamp. The oldest time stamp is used, for example, in following situation: Subscriber A is created in the master database, the master database thus becoming a home database of subscriber A. This creation is not replicated to the slave database because the lines between the master database and, the slave database are cut. Subscriber A is then created in the slave database, the slave database becoming also a home database of subscriber A. This is successful because the slave database does not know that subscriber A already exists and has a home database. During recovery it is found that both databases are home databases of subscriber A although this should not be the case. In this situation the subscriber data with the oldest time stamp is valid.

If the data is to be updated according to the newest time stamp, the slave databasechecks, in step 212, if the time stamp TS is bigger, i.e. younger, than the corresponding time stamp TS' in the slave database. If the time stamp TS is bigger, the more recent data element is in the master database, and the slave database adds, in step 213, an indication of the data element to a result report. The indication is preferably the relative position of the information part of the data element in the summary. Thus the information transmitted in the network can be minimized. The indication can also be something else, such as the data identifier ID. If the time stamp TS' is bigger, the most recent data is in the slave database, which starts, in step 214, to update the data element to the master database, preferably as a background task.

If the data is to be updated according to the oldest time stamp (step 211), the slave databasechecks in step 215, if the time stamp TS' is bigger, i.e. younger, than the corresponding time stamp TS' in the slave database. If the time stamp TS is bigger, the oldest data is in the slave database and the process continues in step 214 described above. If the time stamp TS' is bigger, the oldest data is in the master database and the process continues in step 213 described above.

After either starting to update (step 214) or adding the indication (step 213) the slave database checks, in step 216, if the information part was the last one in the summary. If there are information parts left which have not been compared with the corresponding information in the slave database, the slave database retrieves, in step 217, the next information part and continues the process in step 209 by retrieving the time stamp and the checksum of the corresponding data element from its memory, as described above.

If all information parts have been compared with the corresponding information in the slave database (step 216), the slave database sends, in step 218, the result report to the master database. The result report comprises indications of data elements that should be updated from the master database to the slave database. An empty result report indicates that nothing has to be updated from the master database. In response to the result report, the master database starts to update the indicated data elements to the slave database, preferably as a background task. With one result report the network signalling load is minimized.

After sending the result report (step 218), the slave database may check, if it has in its corresponding data A' such data elements whose information part was not included in the summary, i.e. if it has in data A' such data elements that no longer exist in the corresponding data A. If the slave database has the extra data elements, it may or may not delete them. The decision to delete or not to delete depends on, for example, operator settings and what kind of data is being recovered.

In the above it is assumed, for the sake of clarity, that the slave database can retrieve the information part of the corresponding data element in step 209. If the slave database cannot retrieve the information part, the slave database does not have the corresponding data element, and steps 210, 211, 212 or 215 can be skipped and the process can continue in step 213 where the indication of the missing data element is added to the result report.

In the second preferred embodiment of the invention, some steps, described in greater detail in FIG. 3, are performed between steps 206 and 207.

In another embodiment of the invention steps 201 to 206 are skipped. In the embodiment, when the recovery of data A is initiated, the master database forms the summary and sends it to the slave database.

In another embodiment of the invention, where the data is always to be updated according to the newest time stamp, or corresponding age indicator, steps 211 and 215 are skipped.

Yet in another embodiment of the invention, in step 213, instead of adding the indication to a result report, an update message including the indication of the data element is sent to the master database. In the embodiment in step 218, an acknowledge indicating that the summary is processed is sent to the master database instead of the result report.

Still in another embodiment of the invention, in step 214, instead of starting to update the data element, an indication of the data element may be added to a list, for example, and after/simultaneously/before step 218, the slave database may start to update the data elements in the list to the master database.

In another embodiment of the invention age indicators, e.g. time stamps, are compared first and if they are not the same, then the checksums, i.e. totals, are compared. In other words, between steps 209 and 210 it is checked if the time stamp TS of a data element is equal to the time stamp TS' of a corresponding data element and if the time stamps are equal, the process continues in step 216 and if the time stamps differ, the process continues in step 210.

Yet in another embodiment of the invention, where an age indicator is to be referred to as the total of a data element, in step 209 no checksum (or other calculated total) is retrieved and in step 210, instead of comparing the checksums, the time stamp TS (or other age indicator used) in the summary is compared with the corresponding time stamp TS' in the slave database to find out if they are equal. This embodiment can be used in systems where a difference between age indicators implies that data is different.

FIG. 3 shows signalling according to a second preferred embodiment of the invention. In the second preferred embodiment of the invention the summary is not formed until data A has been divided into smaller data groups a predetermined times in order to find smaller data groups from which to form the summaries. For the sake of clarity it is assumed in the example illustrated in FIG. 3 that data A is divided into smaller data groups only once. For the sake of clarity, data A is divided only into two smaller data groups in the example illustrated in FIG. 3, although data A may be divided into any number of smaller data groups. In the second preferred embodiment, the checksums and the time stamps are used as in the first preferred embodiment.

When the recovery of data A is initiated, the master database DB1 calculates, in point 3-1, a checksum C of all data A as described above in the FIG. 2. The checksum C is sent in message 3-2 to the slave database DB2. In response of receiving message 3-2, the slave database DB2 calculates, in point 3-3, a checksum C' of all the corresponding data A', compares checksum C with C' and deduces whether an update is needed or not as described above in the FIG. 2. In the example illustrated in FIG. 3 it is assumed that the checksums are not the same and an update is therefore needed. The message informing the master database on the result of the comparison, i.e. message 34, is therefore a negative acknowledgement.

In response to receiving a negative acknowledgement 3-4, the master database DB1 divides, in point 3-5, data A into smaller data groups AA and AB according to a predetermined rule and calculates a checksum for each data group. The checksum is calculated as if the data group were data A. The master database sends the checksums AC and BC in message 3-6 to the slave database DB2. In response to receiving message 3-6, the slave database DB2 divides, in point 3-7, the corresponding data into smaller data groups AA' and AB' according to predetermined rules, and calculates checksums AC' and BC' for each data group, compares for each data group checksum AC with AC' and BC with BC' and deduces for each data group whether an update is needed or not. In the example illustrated in FIG. 3, it is assumed that the checksums of data groups AB and AB' are not the same, but the checksums of AA and AA' are the same. In message 3-8 the slave database DB2 sends an indication indicating the data groups which need an update, i.e. in which the checksums are not the same. In the example, message 3-8 indicates the data group AB.

In response to receiving message 3-8, the master database DB1 forms, in point 3-9, a summary comprising for each data element in the data groups indicated in message 3-8, the information part in the second preferred embodiment, i.e. the summary comprises the data identifiers, the time stamps and the checksums of the data elements as described above in FIG. 2. In the example illustrated in FIG. 3, the summary comprises the information part of each data element in the data group AB. The master database sends the summary S to the slave database in message 3-10. In response to receiving the summary, the slave database compares, in point 3-11, the information parts in the summary with the corresponding information parts in its memory and deduces on the basis of the comparison which data elements need to be updated and where, as described in greater detail above in FIG. 2. In the example illustrated in FIG. 3, data elements DE2 and DE4 are updated, in point 3-11, from the slave database DB2 to the master database DB1. When the comparison is ready, i.e. each information part in the summary has been compared with the corresponding information part in the slave database, the slave database DB2 sends, in message 3-12, an indications of the data elements which should be updated in the slave database. In the example illustrated in FIG. 3, data elements DE1 and DE6 should be updated from the master database DB1 to the slave database DB2. In response to message 3-12, the master database DB1 starts to update, in point 3-13, the data elements indicated in the message 3-12, i.e. the data elements DE1 and DE6.

In some other embodiment of the invention, in response to message 3-8, the data group(s) in the message are divided into smaller data groups and thus points 3-5 and 3-7 and signalling messages 3-6 and 3-8 are repeated. This division into smaller data groups may be repeated a predetermined number of times, or the size of the data group may be checked before division, and if the size is smaller than a predetermined limit, the summary is formed. The slave database does not have to know how many times the data groups are divided, because the slave database can deduce from the contents of the message it receives whether to divide the data group into smaller groups or to begin to compare the information parts. However, the rules according to which the smaller data groups are formed have to be the same in both databases.

The steps, points and signalling messages shown in FIGS. 2 and 3 are not in absolute chronological order and some of the steps and/or points may be performed simultaneously or differing from the given order. Other functions can also be executed between the steps and/or points or within the points. Some of the steps and/or points can also be left out. For example, in some embodiments of the invention the checksum C, C' (or other total) may be stored in the database and, thus, instead of calculating it, the database retrieves the checksum. The signalling messages are only exemplary and may even comprise several separate messages for transmitting the same information. In addition, the messages can also contain other information. The messages can also be freely combined or divided into several parts. Furthermore, the names of the messages may differ from the above-mentioned ones. Depending on the network structure, other network nodes between which different functions have been divided may participate in data transmission and signalling.

In one embodiment of the invention the functions of the slave database described above are performed in the master database and the functions of the master database described above are performed in the slave database. In the embodiment, in response to the initiation of data recovery, the master database sends an indication' of recovery to the slave database and in response to said indication the slave starts to perform the functions described above as functions of the master database.

In another embodiment of the invention, the comparison and deduction are carried out in a third network node. In the embodiment the functions of the master database and the slave database are the same and both send the calculated total(s) and/or summaries to the third network node. The third network node compares, deduces and sends responses, described above as functions of the slave database, to the master and slave databases.

The embodiments or parts of the embodiments described above may be freely combined in order to create new embodiments of the invention.

Although the invention is described above with reference to preferred embodiments involving only one data item (data A) and two databases, it is obvious for one skilled in the art that several recovery sessions may run in parallel.

It is to be understood that the above description and the figures related to it are only intended to illustrate the present invention. It will be obvious to a person skilled in the art that the invention may be modified in different ways without deviating from the scope and spirit of the invention disclosed in the appended claims.

The invention claimed is:

1. A method for recovering data in a distributed system where the data is maintained in at least two databases, one of the databases being a master database and at least one other database being a slave database, and the data comprises at least one data element, the method comprising:
   initiating recovery of the data;
   calculating during the recovery a first total from the data in a first database and a second total from a corresponding data in a second database;
   comparing the first total with the second total;
   if the first total and the second total are the same, ending the recovery of the data;
   if the first total and the second total are not the same, the method further comprises during the recovery:
   a) dividing the data and the corresponding data into at least two smaller data groups according to a predetermined rule;
   b) calculating a third total for each data group in the first database and a fourth total for each corresponding data group in the second database;
   c) comparing for each data group the third total with the fourth total; and
   d) deducing on the basis of this comparison in which data group or data groups updating is needed.

2. A method as claimed in claim 1, wherein for each data element in a data group needing updating, the method further comprises:
   e) comparing a fifth total of the data element in the first database with a sixth total of a corresponding data element in the second database; and
   f) initiating an updating procedure for the data element if the fifth total and the sixth total are not the same.

3. A method as claimed in claim 1, the method further comprising:
   e) dividing according to a predetermined rule each data group in the first database needing update and corresponding data group in the second database into at least two smaller data groups;
   f) repeating steps b), c) and d) for the smaller data groups;
   g) repeating step e) for further subdividing the smaller data groups into further smaller data groups and step f) on these further subdivided data groups until a predetermined condition have been met; and after that the method further comprises for data elements in those further subdivided data groups found to need updating in the last repetition period:
   h) comparing a fifth total of a data element of the data group needing updating in the first database with a sixth total of a corresponding data element in the second database; and
   i) initiating an updating procedure for the data element if the fifth total and the sixth total are not the same.

4. A method as claimed in claim 3, wherein if the fifth and sixth totals are not the same, the method further comprises:
   comparing a first age indication of the data element of the data group needing update in the first database with a second age indication of the corresponding data element in the second database;
   deducing on the basis of this comparison whether the data element should be updated in the first database or in the second database.

5. A method as claimed in claim 3, wherein comparing the fifth total with the sixth total further comprises:
   forming in the first database a summary comprising at least an identifier and the fifth total of the data element;
   sending the summary to the second database; and
   performing the comparison between the fifth and sixth totals in the second database.

6. A method as claimed in claim 5, wherein the summary further comprises a first age indication indicating the age of the data element in the first database; and the method further comprises:
   comparing the first age indication with a second age indication of the corresponding data element in the second database if the fifth total and the sixth total are not the same, the second age indication indicating the age of the corresponding data element in the second database; and
   deducing in the second database on the basis of this comparison whether the data element should be updated in the first database or in the second database.

7. A method as claimed in claim 6, the method further comprising:
   starting to update the data element from the second database to the first database if the data element should be updated in the first database; or
   sending from the second database to the first database an update indication indicating the data element which should be updated in the second database.

8. A method as claimed in claim 1, wherein the first database is a master database of the data and the second database is a slave database of the data.

9. A method as claimed in claim 1, wherein said comparing and deducing are performed in a third network node to which the first and second database send the totals.

10. A method as claimed in claim 9, further comprising:
    sending, from both databases, with the total a corresponding age indication indicating the age of the data the total corresponds to;
    comparing a first age indication sent by the first database with a second age indication sent by the second database if the totals are not the same;
    deducing on the basis of this comparison whether the data element should be updated in the first database or in the second database.

11. A method as claimed in claim 1, wherein the total is a checksum.

12. A system comprising at least two network nodes, each of which comprises a memory having at least first data, the first data comprising at least one data element, the network nodes being arranged to maintain the first data;
    the system being arranged to initiate recovery of the first data; to calculate, during the recovery of the first data, a first total from the data in a first memory of a first network node and a second total from the corresponding data in a second memory of a second network node; to compare the first total with the second total; and if the first total and second total are not the same: to divide the first data and the corresponding data into at least two smaller data groups according to a predetermined rule; to calculate a third total for each data group in the first memory and a fourth total for each corresponding data group in the second memory; to compare for each data group the third total with the fourth total; and to deduce on the basis of this comparison in which data group or data groups updating is needed.

13. A system as claimed in claim 12, the system being further arranged to compare a first age indication of a data element of the data group needing updating in the first memory with a second age indication of the corresponding data element in the second memory if the third total and fourth total are not the same; and to deduce on the basis of this comparison whether the data element should be updated in the first memory or in the second memory.

14. A system as claimed in claim 12, the system being further arranged, in response to the third total being different than the fourth total, to divide according to a predetermined rule each data group needing update in the first memory and corresponding data groups in the second memory into at least two smaller data groups; to calculate a third total from the smaller data group in the first memory and a fourth total from the corresponding smaller data group in the second memory; to compare for each data group the third total with the fourth total; to deduce on the basis of this comparison in which data group or data groups updating is needed; to repeat said division, calculation and deduction for subdivided smaller data groups a until a predetermined condition is met; and after that the system is further arranged, for data elements in those further subdivided data groups found to need updating in the last repetition period, to compare a fifth total of a data element of the data group needing updating in a first memory with a sixth total of a corresponding data element in the second memory; and to initiate the updating procedure for the data element if the fifth total and the sixth total are not the same.

15. A system as claimed in claim 12, wherein
the first network node is arranged to form, in response to the recovery of the first data, a summary comprising for a data element of the data group in the first memory at least an identifier and a total; and to send the summary to the second network node; and
the second network node is arranged to perform said calculation of the corresponding total and said comparison between the totals.

16. A system as claimed in claim 15, wherein
the summary further comprises a first age indication indicating the age of the data element; and
the second network node is arranged to compare the first age indication with a second age indication of the corresponding data element in the second memory if the compared totals are not the same; and to deduce on the basis of this comparison whether the data element should be updated in the first memory or in the second memory.

17. A system as claimed in claim 16, wherein
the second network node is arranged to start to update the data element from the second memory to the first memory if the data element should be updated in the first memory.

18. A system as claimed in claim 12, wherein the system further comprises a third network node for performing the comparison of totals and the deduction and the first and second network nodes are arranged to send the totals to the third network node.

19. A network node comprising a memory having at least first data, the first data comprising at least one data element; the network node being arranged to maintain the first data and to be in connection with a second network node comprising second data corresponding to the first data; wherein the network node is arranged, in response to receiving a second total of the second data during recovery of the first data, to calculate a first total from the first data; to compare the second total with the first total; and to request for third totals if the first total and the second total are not the same; and, in response to receiving third totals, to divide the first data into at least two smaller data groups according to a predetermined rule; to calculate a fourth total for each data group; to compare each fourth total with a corresponding third total; and to deduce on the basis of this comparison in which data group or data groups updating is needed.

20. A network node in a system where at least first data is maintained in two network nodes; the network node comprising a memory having at least the first data, the first data comprising at least one data element; wherein the network node is arranged to maintain the first data and to be in connection with a second network node; to calculate during recovery of the first data a first total from the first data; to send the first total to the second network node; to receive a response from the second network node; and if the response indicates that further total is required to divide the first data into at least two smaller data groups according to a predetermined rule; to calculate for each data group a third total; and send the third totals to the second network node.

* * * * *